J. D. CAMPBELL.
MANICURE IMPLEMENT.
APPLICATION FILED APR. 19, 1921.
1,433,936.
Patented Oct. 31, 1922.
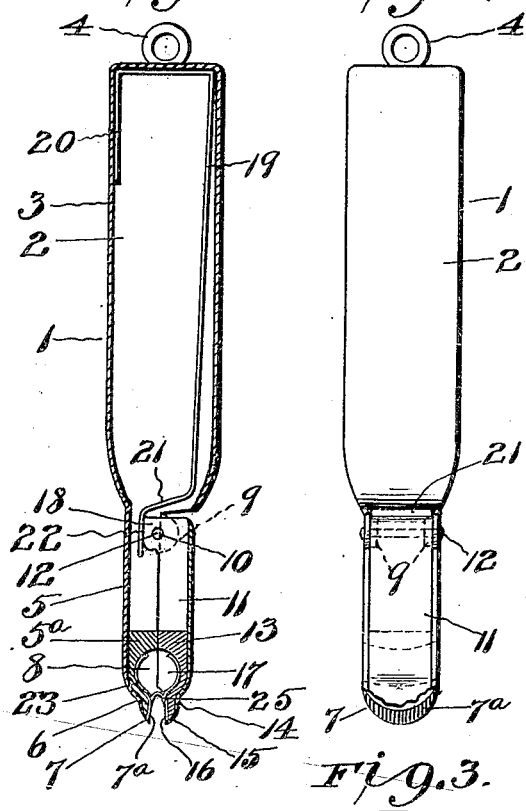
INVENTOR.
John D. Campbell
BY Blackwood Bros,
ATTORNEYS.

Patented Oct. 31, 1922.

1,433,936

UNITED STATES PATENT OFFICE.

JOHN D. CAMPBELL, OF SEA BRIGHT, NEW JERSEY.

MANICURE IMPLEMENT.

Application filed April 19, 1921. Serial No. 462,609.

*To all whom it may concern:*

Be it known that I, JOHN D. CAMPBELL, residing at Sea Bright, in the county of Monmouth and State of New Jersey, a citizen of the United States, have invented certain new and useful Improvements in Manicure Implements; and I do hereby declare the following to be a full, clear, and exact description of the invention, such as will enable others skilled in the art to which it pertains to make and use the same.

My invention relates to improvements in manicure implements and more particularly to an implement for use in treating finger nails.

The object of the invention is to treat the finger nails without injury to the nails or the surrounding or adjacent cuticle.

A further object is to provide an implement which will trim or cut and shape the finger nails and simultaneously clean the space between or remove accumulated dirt from the underside of the nails and the finger ends.

A further object is to provide an implement with means for guarding against cutting or trimming off more of the finger nail than is desired and at the same time providing means for trimming, cutting or shaping the finger nails in such manner as to produce curved edges and prevent ingrowing nails.

A further object is to provide a manicure implement with means by which the cutting or trimming knife may be removed and sharpened or a new knife inserted.

The invention consists in the several features and in the construction, combination and arrangement of such features as is more fully hereinafter described and claimed.

Fig. 1, is a side view of my invention with the lower portion broken away.

Fig. 2, is a central vertical section.

Fig. 3 is a section of the hinged section.

Fig. 4 is a side view in elevation of the cutting knife, and

Fig. 5 is a cross-section of the knife taken on the line 5—5 of Figure 4.

In the drawings in which similar reference characters denote similar parts throughout the several views, 1 represents my manicure implement having a preferably circular casing 2, made of metal, but which if desired may be made of any other desired shape or configuration, or of any material suitable for the purpose, and provided with a main upper portion 3, having a ring 4 for the attachment of a chain or ribbon, and a reduced semicircular lower portion 5, the lower end of which is provided with a solid filled in portion or block $5^a$ curved inward as at 6 and terminates in a pointed lip or lug 7 having a series of corrugations $7^a$ on its inner surface, adapted for use in removing dirt from the underside of the finger nails, and just above the corrugations a semicircular recess 8 is provided and two rounded projecting ears 9 each having a hole 10 therethrough.

A semicircular clamp 11 is pivoted by means of the pin 12 to the two ears 9—9 of the reduced lower portion 5 and is provided at its lower end with a solid filled in portion or block 13 curved inward as at 14 and terminates in a pointed lip or lug 15 having a series of corrugations 16 and just above the corrugations with a semi-circular recess 17. The clamp 11 is provided with rearwardly extending lugs 18 which when pivoted on the pin 12 project into the semicircular portion 5 of the main upper portion 3 of the casing, and 19 is a leaf spring having its upper end 20 bent over at an angle and seated and held against the top and side of the casing 3 while its lower portion is bent rearwardly and downwardly as at 21 and terminates in a vertically extending end 22 which contacts with the lugs 18 and by exerting pressure thereon keeps the pivoted clamp 11 in its normal closed position. The clamp 11 is a counterpart of the parts 5, $5^a$, 6, 7, 8 and is adapted to be used in combination with said parts.

The cutting, trimming or shaping device comprises a curved tubular circular knife 23, made preferably of resilient spring sheet metal with sides 24 and open at the top and provided on its lower portion with a plurality of semicircular cutting teeth 25 having sharp cutting edges 26.

The knife 23 is adapted to be mounted and clamped or held in the semicircular recesses 8 and 17 in reduced portion 5 of the casing and the clamp 11, respectively, the spring 19 keeping the clamp closed and exerting sufficient pressure on the knife to hold it securely and firmly in place in the implement, the spring action of the sides 24 of the knife serving to supplement the pressure exerted thereon by the spring 19.

The points or lips 7 and 15 push the cuticle back, the corrugated portion of the reduced portion 5 and the clamp clean the underside of the nails and the cutting knife trims or cuts the nails to the desired shape in one operation simultaneously.

The instrument is simple, inexpensive and durable in construction, easy to use and effective in results attained. When it is desired to renew the cutting knife or remove the same for sharpening or other cause it is only necessary to pull the clamp outward against the tension of the spring 19 when the knife will drop out of its own accord or may be removed with the fingers.

I do not wish to be understood as limiting myself to the specific details of construction and arrangement as herein described and illustrated, as it is manifest that variations and modifications may be made in the features of construction and arrangement in the adaptation of the device to various conditions of use without departing from the spirit and scope of my invention and improvements. I, therefore, reserve the right to all such variations and modifications as properly fall within the scope of my invention and the terms of the following claims.

What I claim is:—

1. In a manicure implement, a casing provided with a spring controlled pivoted member and a curved knife held in said implement by said pivoted member.

2. In a manicure implement, a casing provided with a seat for a curved knife, a curved knife and a spring controlled member for retaining said knife therein.

3. In a manicure implement, a casing provided with a seat, a curved knife adapted to fit said seat, a spring controlled member for retaining said knife therein.

4. In a manicure implement, a casing provided with a movable member, a curved knife held by said movable member and means for causing said movable member to contact with said kinfe.

5. In a manicure implement, a casing provided with a semi-circular recess, a movable member provided with a semi-circular recess, a knife adapted to be seated in said recesses and a spring for clamping said movable member to the knife and retaining the knife therein.

6. In a manicure implement, a casing provided with a recess, a member pivoted to said casing provided with a recess, a knife seated in said recesses and a spring for clamping the pivoted member to the knife.

7. In a manicure implement, a casing provided with corrugations a member pivoted to said casing provided with corrugations, a knife, means for receiving said knife and means for causing said pivoted member to clamp and hold said knife.

8. In a manicure implement, a casing provided with a recess and corrugations, a pivoted member provided with a recess and corrugations, a knife mounted in said recesses and a spring in said casing for bearing on the pivoted member and clamping it to the knife.

9. In a manicure implement, a casing provided with a semi-circular recess and corrugations, a knife clamping and holding member pivoted to said casing provided with a semi-circular recess and corrugations, a knife mounted in said recesses, and a spring for causing the pivoted member to clamp said knife.

10. In a manicure implement, a casing provided with a semi-circular recess and corrugations, a knife clamping and holding member pivoted to said casing provided with a semi-circular recess and corrugations, a tubular knife mounted in said recesses and provided with a series of depending cutting edges, and a spring for causing the pivoted member to clamp the tubular knife.

11. In a manicure implement, a tubular knife having depending cutting edges at substantially its middle portion and a casing in which said tubular knife is mounted.

12. In a manicure implement, a tubular knife provided with cutting edges and means for mounting said knife.

In testimony whereof I have affixed my signature.

JOHN D. CAMPBELL.